(12) United States Patent
Goodisman

(10) Patent No.: US 12,054,235 B2
(45) Date of Patent: Aug. 6, 2024

(54) FLAME ARRESTER FOR THE SAFER USE OF HYDROGEN AS A LIFTING GAS IN AIRSHIPS

(71) Applicant: Lifting Gas Limited, Middlesex (GB)

(72) Inventor: Michael Ian Goodisman, Middlesex (GB)

( * ) Notice: Subject to any disclaimer, the term of this patent is extended or adjusted under 35 U.S.C. 154(b) by 1205 days.

(21) Appl. No.: 16/607,721

(22) PCT Filed: Jul. 3, 2018

(86) PCT No.: PCT/IL2018/050719
§ 371 (c)(1),
(2) Date: Oct. 24, 2019

(87) PCT Pub. No.: WO2019/008577
PCT Pub. Date: Jan. 10, 2019

(65) Prior Publication Data
US 2020/0129794 A1  Apr. 30, 2020

(51) Int. Cl.
*B64B 1/58* (2006.01)
*A62C 3/06* (2006.01)
*A62C 3/08* (2006.01)

(52) U.S. Cl.
CPC .............. *B64B 1/58* (2013.01); *A62C 3/06* (2013.01); *A62C 3/08* (2013.01)

(58) Field of Classification Search
CPC .................................... B64B 1/58; A62C 3/08
See application file for complete search history.

(56) References Cited

U.S. PATENT DOCUMENTS

| 4,844,974 A | 7/1989 | McCullough, Jr. et al. |
| 4,999,236 A | 3/1991 | McCullough, Jr. et al. |
| 6,896,222 B2 | 5/2005 | Dossas et al. |
| 2004/0155149 A1* | 8/2004 | Dossas ............... B64B 1/62 244/128 |
| 2017/0007866 A1 | 1/2017 | Knowles et al. |
| 2017/0021209 A1* | 1/2017 | Damazo ............... A62C 2/06 |

FOREIGN PATENT DOCUMENTS

| CN | 1718505 A | 1/2006 |
| WO | 9422536 A1 | 10/1994 |

OTHER PUBLICATIONS

Israel Patent Office; Jerusalem; Oct. 29, 2018.

* cited by examiner

*Primary Examiner* — Timothy D Collins
*Assistant Examiner* — Eric Acosta
(74) *Attorney, Agent, or Firm* — Patshegen IP; Moshe Pinchas

(57) ABSTRACT

An airship comprises an envelope accommodating hydrogen further comprising a flame arrester arrangement distributed along the envelope. The flame arrester arrangement comprises a plurality of cells made of mesh panels. The cells are adjoined the envelope and mounted end-to-end to each other.

18 Claims, 3 Drawing Sheets

FLAME ARRESTER FOR THE SAFER USE OF HYDROGEN AS A LIFTING GAS IN AIRSHIPS

FIELD OF THE INVENTION

The present invention relates to an airship, and more specifically to a flame-resistant airship that allows the safer use of hydrogen as a lifting gas.

BACKGROUND OF THE INVENTION

Airships combine the advantages of ships, airplanes and helicopters. Airships are faster than ships, they can carry higher payloads than helicopters and use shorter distances for take-off and landing than airplanes. Airship vibration levels are lower than that of airplanes, and they are not affected by sea state and a corrosive environment. Airships can transport heavy cargoes to remote areas. An airship transportation system causes low air and water pollution. It can meet challenging tasks for which airplanes and helicopters are not well-suited. Long endurance, low noise and vibration levels as well as low vehicle accelerations provide an ideal platform for surveillance and patrol.

Hydrogen airships were in common use in the earlier part of this century and several made numerous transatlantic crossings. The hydrogen airship era ended with the explosion of the Hindenburg in New Jersey. The exact causes that led to the explosion have been debated over the years, but the hydrogen lifting gas at some stage became mixed with air and this mixture was ignited causing the explosion. The ignition may have come from lightning or electrostatic discharge (ESD).

The helium airships that followed face an ever-increasing challenge of helium limited availability and rising cost. Helium cannot currently be manufactured and there are limited supplies below ground. Helium is also in demand for MRI machines, other cryogenics, welding, heat transfer, pressurization and purging, party balloons, leak detection and other uses. Hydrogen can be easily produced in large volumes with today's technology.

U.S. Pat. No. 6,896,222 discloses a lighter-than-air ship using hydrogen or other gas as a lift gas with at least one hydrogen fuel cell aboard. The fuel cell can draw hydrogen fuel from the lift gas reservoir to produce electricity both for the ship's use and optionally for propulsion. The waste product of the fuel cell is water which can be used for the needs of a crew on the ship. The hydrogen lift gas chamber is surrounded by a safety jacket filled with an inert gas and contains optional hydrogen and/or oxygen sensors.

Creating an additional safety jacket and filling it with an inert gas complicate the airship arrangement and decreased ascension power. Thus, there is a long-felt and unmet need to provide a technically simple flame-resistant airship using (flammable) hydrogen as its lifting gas.

SUMMARY OF THE INVENTION

The invention is based on the same approach used to safely provide gas lights for early miners, the "Davy Lamp". The flame of the Davy lamp was surrounded by wire gauze. Any gas leak that passed the flame would combust only within the confines of this gauze. It would not spread to the surrounding mine, so a larger, potentially fatal combustion was avoided. The Davy Lamp was the first flame arrester.

The invention allows an airship to have its envelope filled with hydrogen, a flammable lifting gas. The envelope will comprise a flame arrester arrangement distributed along the inside surface of the envelope. The flame arrester arrangement comprises a plurality of cells made of mesh panels. The cells are adjoined the envelope and mounted end-to-end to each other. Each cell can be considered a scaled-up Davy Lamp with mesh panels of carbon fiber, aluminium alloy or another suitable material (and without the constant flame burning).

The mesh panels forming the cells are interconnected by stitching and zippers.

The mesh panels will consist of between 1 and 3 mesh layers. The mesh layers are made of woven carbon fiber tows (The tows will consist of between 1,000 and 12,000 filaments) or aluminium alloy wire or other suitable materials.

The gaps between the carbon fiber tows (or aluminium alloy wire) are normally no more than 0.40 mm (and never more than 1 mm) in either the picks (longitudinal tows or wires) or the ends (lateral tows or wires) or both.

It is hence one object of the invention to disclose an airship comprising an envelope accommodating hydrogen, a flammable lifting gas.

It is a core purpose of the invention to provide the envelope comprising a flame arrester arrangement distributed along the envelope. The flame arrester arrangement comprises a plurality of cells made of mesh panels. The cells are adjoined the envelope and mounted end-to-end to each other.

Another object of the invention is to disclose the mesh panels forming the cells have between 1 and 3 mesh layers.

Another object of the invention is to disclose the mesh panels forming the cells interconnected by stitching and zippers.

Another object of the invention is to disclose the mesh layers which are made of a material selected from the group consisting of carbon fiber tows, aluminium alloy wires and a combination thereof.

A further object of the invention is to disclose the carbon fiber tows characterized by filament counts between 1,000 (1 k) to 12,000 (12 k)

A further object of the invention is to disclose that the mesh layers are woven such that each passageway has a hydraulic diameter less than the critical diameter of the lifting gas.

A further object of the invention is to disclose that the mesh layers have a single or combined passageway length greater than the quenching length of the lifting gas.

A further object of the invention is to disclose the mesh layers which are characterized by an open area ranging between 10% and 50% of a total area of the mesh layer.

A further object of the invention is to disclose the length of a cell side which is in a range between 0.5 m and 8.0 m.

A further object of the invention is to disclose a method of manufacturing an airship. The aforesaid method comprises the steps of: (a) providing an envelope configured for accommodating hydrogen; (b) providing a flame arrester arrangement; (c) mounting the flame arrester arrangement on the internal surface of the envelope; (d) filling the envelope with hydrogen.

It is another core purpose of the invention to provide the step of the flame arrester arrangement comprising mounting a plurality of cells made of mesh panels. The cells are adjoined the envelope and mounted end-to-end to each other.

BRIEF DESCRIPTION OF THE DRAWINGS

In order to understand the invention and to see how it may be implemented in practice, a plurality of embodiments is adapted to now be described, by way of non-limiting example only, with reference to the accompanying drawings, in which.

DETAILED DESCRIPTION OF THE INVENTION

Figure 1:
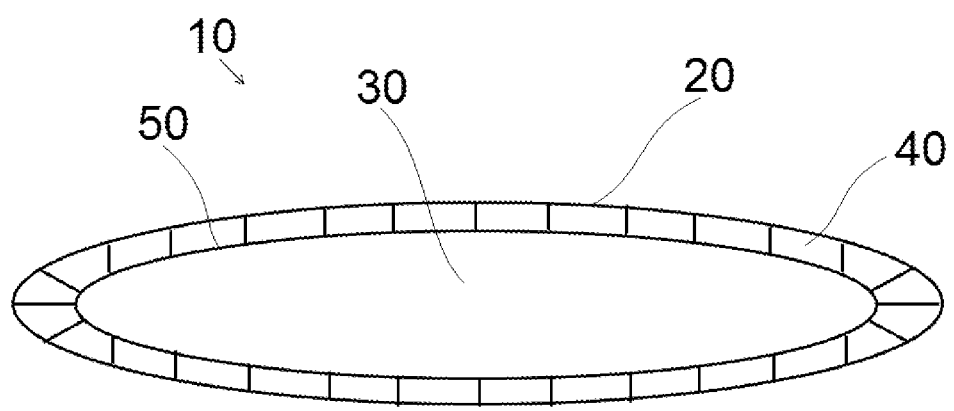
FIG. 1 is a cross-sectional view of an airship.

The following description is provided, so as to enable any person skilled in the art to make use of said invention and sets forth the best modes contemplated by the inventor of carrying out this invention. Various modifications, however, are adapted to remain apparent to those skilled in the art, since the generic principles of the present invention have been defined specifically to provide an airship and a method of manufacturing the same.

The term "Airship" refers hereafter to airships, aerostats, dirigibles, balloons and other fully buoyant or partially buoyant large air craft.

The term "Hydrogen" refers hereafter primarily to hydrogen but also to other flammable gases that can be used as lifting gases in Airships. Note that critical diameter and quenching length values are determined for each gas type and can be different to the critical diameter and quenching length for hydrogen.

The British MESG "Maximum Experimental Safe Gap" for hydrogen is 0.28 mm (adjusted to 1 atmosphere and 293 K) reported by [1] as part of MESG comparisons in [2] and based on experimental work of [3]. Whilst MESG gives an indication of the flame arrester passageway dimensions, more detailed analysis follows below.

Ref [1] states that for a flame to be quenched, the flame arrester passageways must be small enough to extract heat from the flame faster than it can be generated by chemical reactions. The smaller the cross sectional area $A_C$ area, the greater is ratio of longitudinal surface area to volume $A_L/V$ So for a cylindrical passageway of length L $$\frac{A_L}{V} = \frac{L \cdot (\pi \cdot D)}{L \cdot \left(\pi \cdot \frac{D^2}{4}\right)} = \frac{L \cdot \pi \cdot D}{L \cdot \pi \cdot \frac{D^2}{4}} = \frac{L \cdot (P)}{L \cdot (A_C)} = \frac{L \cdot 4}{L \cdot D}$$

So, $$D = 4 \cdot \frac{A_C}{P} = D_h,$$

where $D_h$ is defined as the hydraulic diameter (and P is the perimeter).

Note that the passageway length has been removed from the equation, and in practise the equation has been used successfully for the design of flame arresters for slow flame speeds. Ref [1] shows the work of [4] which states the critical (quenching) diameter of hydrogen $D_{cr}$ to be 0.7 to 0.9 mm. $D_h$ must be less than the critical (quenching) diameter $D_{cr}$ for the arrester to work.

For a woven mesh panel (with square passageways instead of circular passageways), an equivalent hydraulic diameter can be calculated for each passageway from [1] using $$D_h = 1/M - D_W$$

where $D_W$ is the diameter of the wire and M is the number of meshes per unit length For high speed flames, such as those produced by hydrogen combustion, the length of the flame arrester passageway must also be taken into account. A longer passageway allows the arrester more time to quench the fast moving flame.

From [5] based on the work of [6] for crimped ribbon flame arresters, the quenching length needed for high speed flames can be calculated from $$L_q = (v_t \cdot D_h^2)/(100 \cdot v) \qquad (1)$$

where $L_q$ is the quenching length (cm), $v_t$ is the turbulent flame speed (cm/s) and $v$ is the kinematic viscosity (cm$^2$/s) of the combustion products. If the quenching length is very short, say less than 1 mm, then it is reasonable to apply this equation to a woven mesh, as such a short crimp would be similar.

The kinematic viscosity (m$^2$/s) is defined as $$v = \eta/\rho \qquad (2)$$

where $\eta$ is dynamic viscosity (Pa·s) and $\rho$ is density (kg/m$^3$). Both $\eta$ and $\rho$ are for the combustion products in the current analysis.

From [7], the dynamic viscosity for dry air is a function of static temperature T (K)

$$\eta = 1.5105 \times 10^{-6} \times T^{1.5}/(T+120) \qquad (3)$$

Chart 3.7 within [7] illustrates the above relationship for pure air and kerosene combustion products (for fuel-air ratios up to 0.05) and notes that the chart may be used for combustion products of all fuel air mixtures with negligible error. The chart goes up to 1600 K. I have assumed the equation can be used for higher temperatures to provide reasonable estimates of dynamic viscosity for combustion products of fuel-air mixtures (including combustion products of hydrogen-air mixtures).

An adiabatic flame temperature at constant pressure of stoichiometric hydrogen-air mixture at atmospheric conditions will have a flame temperature of around 2550 K. The adiabatic flame temperature is the maximum temperature the combustion products can reach.

Ref [9] is an experimental study of unconfined large-scale hydrogen-air deflagrations. Ref [8] also refers to key results of [9]. The study shows that the flame speed for unconfined stoichiometric hydrogen-air deflagration is around $v_f$=40 m/s for the first 4 m flame front radius, 0.1 s after ignition and 80 m/s over the next 12 m flame front radius, an additional 0.15 s.

At high temperatures (and pressures near atmospheric), the combustion products can behave like a perfect gas.

So, $$\rho = p/(R \cdot T)$$

where p=110,000 Pa (this value derived below), T=2550 K and gas constant R=287.1 J kg$^{-1}$ K$^{-1}$ So $\rho$=0.1503 kg/m$^3$ So, from the above analysis, (3) gives $\eta$=72.848×10$^{-4}$ Pa·s, (2) gives $v$=4.8484×10$^{-4}$ m$^2$/s=4.8484 cm$^2$/s and (1) gives quenching length $L_q$=0.0132 cm=0.132 mm for up to 4 m flame front radius and $L_q$=0.0264 cm=0.264 mm for up to 16 m flame front radius (For $D_h$=0.04 cm=0.4 mm, these give passageway length to hydraulic diameter ratios of 0.33 and 0.66, respectively).

Existing crimped ribbon flame arresters used in pipes for hydrogen-air flames are around 20 mm long. So, why is this arrester theoretically less than 1 mm?

A key driver for this short quenching length is the unconfined nature of the combustion which results in a flame speed of around 40 to 80 m/s. Ref [10] measured hydrogen-air flame speeds in (confined) pipes at 400 m/s in deflagration and just under 1,400 m/s in detonation.

From (1), the quenching length is directly proportional to flame speed. There is more time for a flame arrester to quench a much slower moving unconfined flame front.

This small quenching length (less than 1 mm), which is related to the "thickness" of the flame arrester allows for the design of thin, light-weight woven meshes which in turn can be used to cover large areas in order to quench largely unconfined flame fronts.

The open area of the mesh will be 10% to 50% of a total mesh area.

The cells and panel shapes will vary within the envelope but will mostly be close to the following: Cubic cell shapes made up of square "top" panels (panels not connected to the envelope) and rectangular "side" panels (connected to the envelope).

So for example, a top panel can be 3 m×3 m and a side panel can be 3 m×2 m. A panel's length and width will be between 0.5 m and 8 m.

These joined cells make a protective cell layer around the inside of the envelope. They are a passive protection such that if there is a tear in the envelope fabric causing hydrogen and air to mix then should ignition occur (e.g. from lightening or electrostatic discharge), the resulting combustion would be contained within one or a few cells (depending on the nature of the tear). Above all, the central volume of hydrogen would be less likely to combust.

Reference is now made to FIG. 1, presenting cross-sectional view of airship 10 filled with hydrogen which is lighter than air. Envelope 20 is provided with celled mesh structure 50 disposed along envelope 20 to prevent propagation of a fire outbreak from peripheral portion 40 of the inner space adjoining to a wall of envelope 20 to central space 30.

Figure 2:
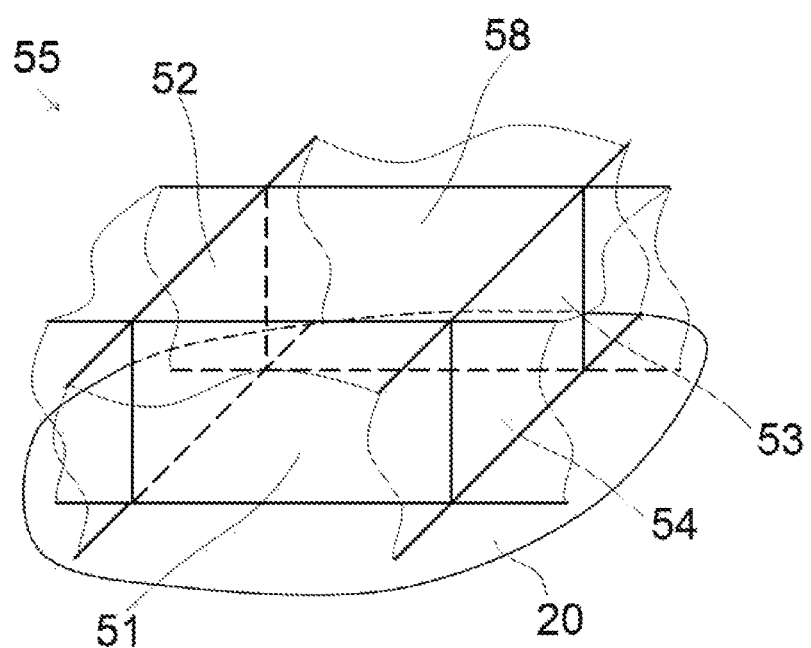
FIG. 2 is a schematic perspective view of a celled structure of a flame arrester.

Reference is now made to FIG. 2, showing celled mesh structure 50 in detail. Elementary cell 55 is formed by mesh panels 51, 52, 53 and 54 which are substantially perpendicular to envelope 20 and panel 58 which is substantially parallel to envelope 20. A different geometry of celled mesh structure is in the scope of the present invention.

Figure 3:
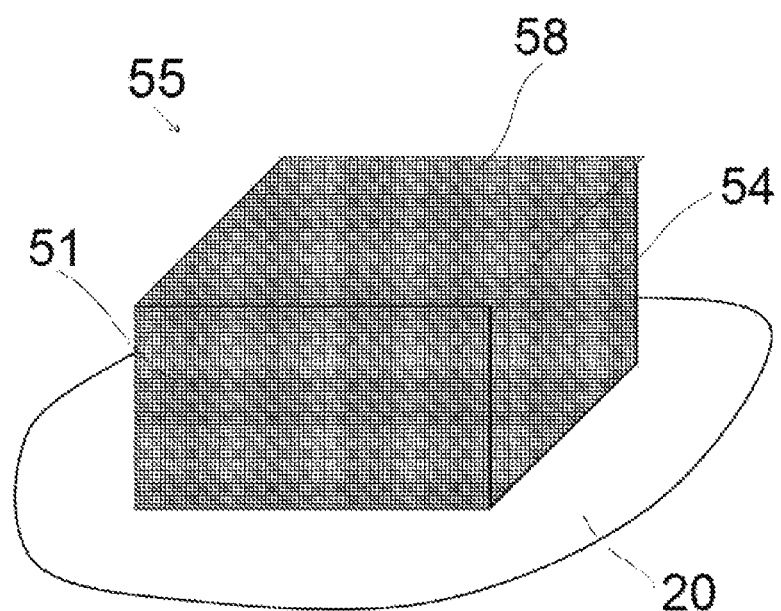
FIG. 3 is a schematic perspective view of an exemplary mesh cell of a flame arrester.

Reference is now made to FIG. 3, illustrating elementary cell 55. According to an exemplary embodiment of the present invention, mesh panels 51-54 and 58 are made of carbon fiber tows or aluminium alloy wires. Interconnection of the aforesaid panels by means of stitching and zippers (not shown) is in the scope of the present invention.

A) Example Design Using Carbon Fiber:

For an airship design similar to HAV606 (200 tonne payload):

Envelope volume=457,500 m$^3$.

Surface area (estimate)=37,720 m$^2$.

Flame Arrester Design and Passageway Parameters:

Carbon fiber tow (commercially available Hexcel IM7 Carbon Fiber (6000 Filaments)) is of cross sectional area 0.13 mm$^2$ and diameter 0.407 mm. Tow mass per unit length 0.223×10$^{-3}$ kg/m.

For a cell with a top panel 3 m×3 m and side panels 3 m×2 m each and each panel with 2 mesh layers. The tows are woven with 0.4 mm gaps between both picks (longitudinal tows) and ends (lateral tows).

For the top mesh layer, the number of tows would be 3000 mm/(0.407 mm+0.40 mm)=3717 picks and 3,717 ends (lateral tows) giving 7,435 tows total with an open area of 25% of the total area of the mesh and so closed area is 75%.

Meshes (i.e. tows) per unit length, M=3717/3000=1.239 per mm

So hydraulic diameter $D_h$=1/M−$D_w$=1/1.239−0.407=0.400 mm (less than critical diameter, $D_{cr}$ 0.7 mm to 0.9 mm)

And L=(2×$D_w$)×number of mesh layers=(2×0.407)×2=1.628 mm (more than required quenching length, $L_q$ 0.132 mm for up to 4 m flame front radius and $L_q$ 0.264 mm for up to 16 m flame front radius).

(Note that compression of tows during weaving process will reduce L and $D_h$ so design may need to be adjusted).

Total Flame Arrester Mass and Resulting Airship Payload:

Mass of top panel (2 mesh layers) is 2×7,435×3×0.223×10$^{-3}$=9.948 kg.

Using similar approach adjusted for rectangular shape,

Mass of side panel (2 mesh layers) is =6.632 kg.

Mass of cell (made up of 1 top panel and 2 side panels)=23.212 kg. (Note that the 3-panel cells when stitched together and connected to the envelope make closed cells).

Number of cells to cover envelope surface area (approximately)=37,720/9=4,191.

Total weight of flame arrester panels=37,720×23.212=97,284 kg=97.3 tonne (excluding seams and zippers).

Additional lift L from using hydrogen instead of helium=457,500 (0.164-0.085)=36,143 kg=36.1 tonne, where 0.164 kg/m$^3$ is helium density and 0.085 kg/m$^3$ is hydrogen density.

So by replacing helium with hydrogen and the one layer of cells (giving the envelope a 2 m protective layer), the payload of HAV606 becomes 200-97.3+36.1=138.8 tonne, which can still be considered a practical payload.

And if two layers of cells are used (giving a 4 m protective layer), the payload becomes 41.5 tonne, too low for this example panel design.

For larger airships there will be a reduced percentage drop in payload for each layer of these cells.

Panels from other materials and/or alternatives to woven mesh such as perforated sheets or membranes might provide design improvements, provided the flame arresting passageway characteristics are met (hydraulic diameter $D_h$ less than the critical diameter $D_{cr}$ and passageway length L greater than the quenching length $L_q$).

Hydrogen-Air Combustion Pressure Loads on a Cell:

From [9], stoichiometric hydrogen-air mixtures were ignited at ground level and ambient conditions inside hemispherical plastic envelopes up to 25 m diameter. The plastic envelopes would easily burst during combustion to ensure unconfined combustion.

As mentioned, the average flame front velocity was 40 m/s during the first 4 m radius, 0.1 s and 80 m/s over the next 12 m radius, 0.15 s, so a deflagration (not a more severe detonation).

A maximum static pressure rise of 3 kPa was measured 2 m radius from the ignition point and a 6 kPa statics pressure rise was measured 5 m radius from the ignition point (In fact a peak of 10 kPa static pressure rise was measured 5 m radius from the ignition point, but the authors of [9] suspect an instrumentation reaction caused the 10 kPa spike, and the more constant 6 kPa rise was the real maximum).

From [11] it is possible to estimate the pressure drop across a wire mesh with 25% open area as 2 kPa. So for 2 mesh layers, estimating as 4 kPa total.

So, during combustion, we can estimate maximum static pressure downstream of the mesh panels as 100 kPa (atmospheric)+6 kPa (pressure rise during combustion)=106 kPa and we can estimate maximum static pressure upstream of the mesh panels as 100 kPa (atmospheric)+6 kPa (pressure rise during combustion)+4 kPa (pressure drop across flame arrester)=110 kPa.

For the top square mesh panel with 3 m side, the 4 kPa drop would cause a maximum shear stress of pressure drop across mesh panel×panel area/(tow cross section area×number of tow ends for 1 layer×number of mesh layers)

$$(4\times10^3)\times(3\times3)/(0.13\times10^{-6}\times2\times7,435\times2)=4.66\times10^6 \text{ Pa}=9.31 \text{ MPa}.$$

The shear yield stress of the carbon fiber tow is 128 MPa (tensile yield stress is 5480 MPa). So this simple shear stress calculation indicates the top mesh panel design is strong enough to withstand the combustion pressure in the cell. The smaller side panels will have lower shear stresses than the top panel.

Hydrogen-Air Combustion Heat Loads on a Cell:

The heat produced within the cell during combustion is determined by the amount of hydrogen that combusts within the cell.

The following analysis shows that most of the original hydrogen within the cell (before combustion) is ejected through the mesh panels (during combustion) by the advancing flame front before the flame front reaches it. This is a critical characteristic which keeps the energy released by the combusting hydrogen relatively low and so prevents the light weight mesh panels from overheating during combustion.

Using Equation of State in one cell before combustion $(p_1 \cdot V_1 = m_1 R T_1)$ and after combustion $(p_2 V_2 = m_2 R T_2)$, assuming the resultant high temperature (close to atmospheric pressure) combustion products (water vapour, nitrogen and nitrogen oxides) behave like a perfect gas. Also assuming cell walls deflect during combustion to give around 20% additional volume $(V_2/V_1=1.2)$ $$\text{gives } m_2/m_1 = (p_2/p_1)\cdot(V_2/V_1)\cdot(T_1/T_2) = (110 \text{ kPa}/100 \text{ kPa})\times1.2\times(288 \text{ K}/2550 \text{ K})=0.1491.$$

From [8] and [9], the hydrogen-air mixture had 29.7% hydrogen by volume, which is very close to published stoichiometric hydrogen-air mixture of $V_H/(V_H+V_{air})=0.296$, 29.6% hydrogen by volume ($V_{air}/V_H=2.39$) and published $m_H/(m_H+m_{air})=0.283$, 2.83% hydrogen by mass ($m_{air}/m_H=34.33$).

From [8] and [9], the density of the stoichiometric hydrogen-air mixture was 0.8775 kg/m³. The volume of the cell prior to combustion is 18 m³.

So the mass of hydrogen in cell prior to combustion is:

$$m_{H1}=0.8775\times18\times0.0283=0.4470 \text{ kg}$$

and the mass of hydrogen actually burnt during combustion (and not ejected through the mesh panels), can be estimated as:

$$m_{H2}=m_{H1}\cdot m_2/m_1=0.4470\times0.1491=0.06665 \text{ kg}$$

Combustion energy released per unit mass of hydrogen is 140 MJ/kg

So, the energy released by the combusted hydrogen mass in the cell, $$E=140\times0.06665=9.331 \text{ MJ}$$

Assuming all this energy is absorbed by 1 top panel and 4 side panels, m=1×9,948 kg+4×6,632 kg=36.476 kg.

$c=879$ J/Kg·K (Specific Heat capacity of HexTow IM7 carbon fiber)

So temperature rise for each panel is.

$$\Delta T=E/(m\cdot c)=9.331\times10^6/(36.476\times879)=291 \text{ K}.$$

So the temperature of the panels immediately after combustion is 288 K+291 K=579 K.

In reality, during combustion (the higher pressure phase for the mesh panels) a relative low portion of the hot gas will transfer its heat to the mesh panels (the remaining hot gases would initially remain within the cell).

So if 30% of the energy released is transferred to the panels, the temperature rise $\Delta T=87$ K and the temperature of the panels immediately after combustion is 288 K+87 K=375 K.

Following completion of combustion, the hot gases may drift through fewer panels. However, the panels would not be under combustion pressure loads and the heated panels would have more time for heat to be conducted away to cooler neighbouring panels and cooler air outside the cell. Also, some of the heated gas may mix with cooler air near the initial tear which caused the air to enter the envelope in the first place.

The auto-ignition temperature of hydrogen 793 K [12].

So this very simple analysis indicates the mesh panels would not auto-ignite the gases that have already passed through the cell.

During the manufacturing stage, carbon fibers are heated up to 1800 K-3000 K range. The melting point of carbon fiber is around 3800 K. (Carbon Fibers with epoxy resins would probably need to be avoided as epoxy resins melt at significantly lower temperatures).

B) Example Design using Aluminium Alloy

Note that replacing the carbon fiber tows with aluminium alloy wires (e.g. Aluminium Alloy 6061) of $\rho=2,700$ kg/m³ and same diameter 0.407 mm and gaps 0.4 mm (giving mass per unit length of 0.0003513 kg/m) and using same mesh panel dimensions and number of mesh layers and $c=897$ J kg⁻¹ K⁻¹, the key results are:

Hydraulic diameter $D_h=1/M-D_w=1/1.239-0.407=0.400$ mm (less than critical diameter, $D_{cr}$ 0.7 mm to 0.9 mm)

$L=(2\times D_w)\times$number of mesh layers=$(2\times0.407)\times2=1.628$ mm (more than required quenching length 0.132 mm for up to 4 m flame front radius and 0.264 mm for up to 16 m flame front radius).

| | |
|---|---|
| Mass of top panel | 15.672 kg |
| Mass of side panel | 10.448 kg |
| Payload using H & cells | 83 tonne (payload using He is 200 tonne) |
| Maximum shear stress | 9.30 MPa (shear yield stress 270 MPa, tensile yield stress 310 MPa) |

Temperature of the panels immediately after combustion is 469 K if all energy is transferred to the cell panels and 342 K if 30% energy is transferred to the cell panels. (The auto-ignition temperature of hydrogen is 793 K. The melting point of Aluminium Alloy 6061 is 855 to 925 K)

According to one embodiment of the present invention, an airship comprising an envelope accommodating hydrogen lifting gas is disclosed. It is a core feature of the invention to provide the envelope comprising a flame arrester arrangement distributed along the envelope. The flame arrester arrangement comprises a plurality of cells made of mesh panels. The cells are adjoined the envelope and mounted end-to-end to each other.

According to another embodiment of the present invention, mesh panels forming the cells have between 1 and 3 mesh layers.

According to another embodiment of the present invention, the mesh panels forming the cells interconnected by stitching and zippers.

According to a further embodiment of the present invention, the mesh layers are made of a material selected from the group consisting of carbon fiber tows, aluminium alloy wires and a combination thereof.

According to a further embodiment of the present invention, the carbon fiber tows are characterized by filament counts between 1,000 (1 k) to 12,000 (12 k).

According to a further embodiment of the present invention, the mesh layers are woven such that each passageway has a hydraulic diameter less than the critical diameter of the lifting gas.

According to a further embodiment of the present invention, the mesh layers have a single or combined passageway length greater than the quenching length of the lifting gas.

According to a further embodiment of the present invention, the mesh is characterized by an open area ranging between 10% and 50% of a total area of the mesh.

According to a further embodiment of the present invention, a size of the cell is in a range between 0.5 m and 8.0 m.

According to a further embodiment of the present invention, a method of manufacturing an airship is disclosed. The aforesaid method comprises the steps of: (a) providing an envelope configured for accommodating hydrogen; (b) providing a flame arrester arrangement; (c) mounting the flame arrester arrangement on internal walls of the envelope; (d) filling the envelope with hydrogen.

It is another core feature of the invention to provide the step of the flame arrester arrangement comprising mounting a plurality of cells made of mesh panels. The cells are adjoined the envelope and mounted end-to-end to each other.

NOMENCLATURE

A area, $m^2$
c specific heat capacity, $J\ kg^{-1}\ K^{-1}$
D diameter, m
E energy, J
H hydrogen
He helium
L length, m
M number of meshes per unit length, $m^{-1}$
m mass, kg
p pressure, Pa
R gas constant, $J\ kg^{-1}\ K^{-1}$
T temperature, K
V volume, $m^3$
v velocity, m/s
ρ density, $kg/m^3$
η dynamic viscosity, Pa·s
ν kinematic viscosity, $m^2/s$

SUBSCRIPTS air air
C cross sectional
cr critical
H hydrogen
h hydraulic
L longitudinal
q quenching
t turbulent
W wire
1 pre combustion
2 post combustion

REFERENCES

1. Stanley S. Grossel (2010) Detonation and Deflagragion Flame Arresters
2. Britton, L. G. 2000a. Using Maximum Experimental Safe Gap to Select Flame Arresters. Process Safety Progress, 19(3), 140-145.
3. Lunn, G. A. 1982a. An Apparatus for the Measurement of Maximum Experimental Safe Gaps at Standard and Elevated Temperatures. J. Hazardous Materials, 6,329-340 (1982).
4. Smolensky, V. G. 1999. Personal communication from Vadim G. Smolensky, NAO Inc., to S. S. Grossel (Aug. 4, 1999).
5. Piotrowski, T. C. 1991. Specification of Flame Arresting Devices for Manifolded Low Pressure Storage Tanks. Plant/Operations Progress, 10(2), 102-106.
6. Wilson, R P. and Attalah, S. 1975. Design Criteria for Flame Control Devices for Cargo Venting Systems. U.S. Coast Guard Report CG-D-175-75. Department of Transportation, Washington, D.C.
7. Walsh, P. P. and Fletcher, P., 2004. Gas Turbine Performance (second edition)
8. LES modelling of an unconfined large-scale hydrogen-air deflagration by Vladimir Molkovm, Dmitry Makarov and Helmut Schneider (2006)
9. Fraunhofer-institut für treib-und explosivstoffe 1983. ICT-Projektforschung 1983. Forschungsprogramm "ProzeBgasfreisetzung—Explosion in der Gasfabrik und Auswirkungen von Druckwellen auf das Containment". Ballonversuche zur Untersuchung der Deflagration von Wasserstoff/Luft-Gemischen (AbschluBbericht). Projekteiter: H. Pfortner, Bearbeiter: H. Schneider, Dezember 1983
10. S. B. Dorofeev, M. S. Kuznetsov, V. I. Alekseev, A. A. Efimenko and W. Breitung, Evaluation of limits for effective flame acceleration in hydrogen mixtures, Journal of Loss Prevention in the Process Industries, Volume 14, Issue 6, Pages 583-589, 2001.
11. Pinker, R A. and Herbert, M. V., 1967. Pressure Loss Associated with Compressible Flow Through Square-Mesh Wire Gauzes.
12. NFPA 325. 1994. Fire Hazard Properties of Flammable Liquids, Gases, and Volatile Solids. National Fire Protection Association, Quincy, MA.

The invention claimed is:

1. An airship comprising:
an envelope defining an inner space for accommodating hydrogen;
a flame arrester arrangement mounted along an inner surface of said envelope; said flame arrester arrangement comprises a plurality of cells each of which defining a volume separating between a portion of said inner surface and said inner space, said cells are mounted end-to-end to each other such that the entire inner surface of said envelope is covered by said cells;
wherein each of said cells is made of mesh panels separating between said volume and said inner space and separating between adjacent cells said mesh panels having a plurality of passageways configured to extract heat from a flame in the volume of the cell and to block said flame from entering said inner space.

2. The airship according to claim 1, wherein mesh panels forming the cells have between 1 and 3 mesh layers.

3. The airship according to claim 1, wherein mesh panels forming said cells are interconnected by stitching and zippers.

4. The airship according to claim 2, wherein said mesh layers are made of a material selected from the group consisting of carbon fiber tows, aluminium alloy wires and a combination thereof.

5. The airship according to claim 4, wherein said carbon fiber tows are characterized by filament counts between 1,000 (1 k) to 12,000 (12 k).

6. The airship according to claim 4, wherein said mesh layers are woven such that each passageway has a hydraulic diameter less than the critical diameter of the lifting gas.

7. The airship according to claim 4, wherein said mesh layers have a single or combined passageway length greater than the quenching length of the lifting gas.

8. The airship according to claim 4, wherein said mesh is characterized by an open area ranging between 10% and 50% of a total area of said mesh.

9. The airship according to claim 1, wherein a size of said cell is in a range between 0.5 m and 8.0 m.

10. A method of manufacturing an airship; said method comprising the steps of:
  a. providing an envelope defining an inner space configured for accommodating hydrogen;
  b. providing a flame arrester arrangement;
  c. mounting said flame arrester arrangement along an inner surface of said envelope of said envelope;
  d. filling said envelope with hydrogen;
  wherein said step of said flame arrester arrangement comprises mounting a plurality of cells, each of which defining a volume separating between a portion of said inner surface and said inner space, said cells are mounted end-to-end to each other such that the entire inner surface of said envelope is covered by said cells;
  wherein each of said cells is made of mesh panels separating between said volume and said inner space and separating between adjacent cells; wherein each one of said mesh panels includes a plurality of passageways configured to extract heat from a flame in the volume of the cell and to block said flame from entering said inner space.

11. The method according to claim 10, wherein mesh panels forming the cells have between 1 and 3 mesh layers.

12. The method according to claim 10, wherein mesh panels forming said cells are interconnected by stitching and zippers.

13. The method according to claim 10, wherein said mesh panels are made of a material selected from the group consisting of carbon fiber tows, aluminium alloy wires and a combination thereof.

14. The method according to claim 13, wherein said carbon fiber tows are characterized by filament counts between 1,000 (1 k) to 12,000 (12 k).

15. The method according to claim 10, wherein said mesh layers are woven such that each passageway has a hydraulic diameter less than the critical diameter of the lifting gas.

16. The method according to claim 10, wherein said mesh layers have a single or combined passageway length greater than the quenching length of the lifting gas.

17. The method according to claim 10, wherein said mesh panels are characterized by an open area ranging between 10% and 50% of a total area of the mesh panels.

18. The method according to claim 10, wherein a size of said cell is in a range between 0.5 m and 8.0 m.

\* \* \* \* \*